United States Patent [19]

Bauer

[11] Patent Number: 5,178,849
[45] Date of Patent: Jan. 12, 1993

[54] PROCESS FOR MANUFACTURING ALPHA ALUMINA FROM DISPERSIBLE BOEHMITE

[75] Inventor: Ralph Bauer, Niagara Falls, Canada

[73] Assignee: Norton Company, Worcester, Mass.

[21] Appl. No.: 673,873

[22] Filed: Mar. 22, 1991

[51] Int. Cl.$^5$ .............. C01F 7/30; C01F 7/02; C04B 35/10
[52] U.S. Cl. .................. 423/626; 423/625; 423/629; 501/153; 51/309
[58] Field of Search ............ 423/626, 625, 629, 628, 423/123; 252/313.1, 315.7; 501/153; 51/309

[56] References Cited

U.S. PATENT DOCUMENTS

| | | | |
|---|---|---|---|
| 2,787,522 | 4/1957 | Lefrancois | 23/143 |
| 2,915,475 | 12/1959 | Bugosh | 252/313.1 |
| 3,031,418 | 4/1962 | Bugosh | 252/313.1 |
| 3,056,747 | 10/1962 | Arthur | 252/313.1 |
| 3,207,578 | 9/1965 | Brown et al. | 423/626 |
| 3,357,791 | 12/1967 | Napier | 23/143 |
| 3,385,663 | 5/1968 | Hughes | 423/626 |
| 3,790,495 | 2/1974 | Podschus | 252/313.1 |
| 3,954,659 | 5/1976 | O'Brien | 252/313.1 |
| 3,966,893 | 6/1976 | Derolf et al. | 423/628 |
| 4,117,105 | 9/1978 | Hertzenberg et al. | 423/625 |
| 4,314,827 | 2/1982 | Leitheiser et al. | 51/298 |
| 4,344,928 | 8/1982 | Dupin et al. | 423/626 |
| 4,360,449 | 11/1982 | Oberlander et al. | 252/313.1 |
| 4,623,364 | 11/1986 | Cottringer et al. | 51/309 |
| 4,676,928 | 6/1987 | Leach et al. | 252/313.1 |
| 4,744,802 | 5/1988 | Schwabel | 51/309 |
| 4,797,139 | 1/1989 | Bauer | 423/628 |
| 4,835,124 | 5/1989 | Pearson | 501/12 |
| 4,964,883 | 10/1990 | Morris et al. | 51/293 |

FOREIGN PATENT DOCUMENTS

| | | | |
|---|---|---|---|
| 1062985 | 9/1979 | Canada | 252/313.1 |
| 168606 | 1/1986 | European Pat. Off. | 423/626 |
| 2220651 | 1/1991 | United Kingdom . | |

OTHER PUBLICATIONS

Bauer, R., United States Statutory Invention Registration, Reg. No. H189, published Jan. 6, 1987.
Weast, R. C., ed. "Handbook of Chemistry and Physics", 54th Ed. CRC Press: Cleveland (1973), p. E-20.
Grant, R., Grant, C., eds. "Chemical Dictionary", 5th Ed. McGraw Hill: New York (1987), p. 540.

*Primary Examiner*—Michael Lewis
*Assistant Examiner*—Peter T. DiMauro
*Attorney, Agent, or Firm*—David Bennett

[57] ABSTRACT

A boehmite or boehmite precursor can be improved in its dispersibility by subjecting it to a hydrothermal treatment at a pH of less than 3.5 and at elevated temperature and pressure.

1 Claim, No Drawings

PROCESS FOR MANUFACTURING ALPHA ALUMINA FROM DISPERSIBLE BOEHMITE

BACKGROUND OF THE INVENTION

This invention relates to the manufacture of finely divided boehmite, (sometimes called alpha alumina monohydrate), from alumina trihydrate, amorphous alumina, less finely divided boehmite and the like.

In the production of ceramic forms of alumina with a very fine crystalline size of less than one micron, it is highly desirable to use as a starting material a similarly finely divided form of the precursor material. This is particularly true when the process used is a sol-gel process such as is described in, for example U.S. Pat. Nos. 4,314,827 or 4,623,364. Such patents use a sol of alumina monohydrate which is then gelled either by reduction of water content or more usually by peptization using an acid. This gelled form may then be dried, comminuted and sintered at relatively low temperatures to give alpha alumina structures with very fine and uniform particle sizes. The above process may be carried out in the presence of modifying agents such as magnesia, zirconia, silica, titania, chromia or compounds that break down to such oxides under sintering conditions, and/or seed materials that favor the formation of the alpha alumina form. Such seed materials can be any one of those materials that are stable under the reaction conditions and which have the same crystal structure as the target alpha alumina and similar lattice parameters to those of alpha alumina. The preferred seed material is of course alpha alumina itself but other seed materials within the above definition such as alpha ferric oxide, added ab initio or generated in situ, can be used in many circumstances.

As indicated above it is highly advantageous in the operation of such a process that the boehmite dispersion be as fine as possible and as free as possible of agglomerates which tend to convert as such and produce similar agglomerates in the alpha form. It is found that such agglomerates are associated with a reduction in the properties of the final products. For example, abrasive grits made of such material are often less effective than those in which the crystal size is uniformly microcrystalline.

It is apparent therefore that there is substantial advantage in securing a feedstock that has the uniform microfine crystal structure referred to above. One method of obtaining such products is described in U.S. Pat. No. 4,117,105 in which an alumina trihydrate is first calcined to increase its surface area through a partial dehydration and then autoclaved to achieve crystallization and rehydration. The result is apparently to produce a product with a crystallite size smaller than that of the starting material.

Another process for producing a water dispersible alumina from a hydrolysate of an aluminum alkoxide is described in U.S. Pat. No. 4,676,928. In this process the alumina slurry is aged at a pH of 5 to 9 at a temperature above 70° C. for enough time to convert the greater part to a colloidal sol.

Other processes for the production of alumina in a sol form are described in U.S. Pat. Nos. 2,590,833; 2,787,522; 2,915,473; 3,357,791 and 3,966,893.

However none of the above methods are capable of converting an alumina monohydrate precursor having a substantial degree of particulate inhomogeneity into a product with essentially uniform, ultrafine, (i.e. less than 1000 angstroms), particles that are particularly suitable for the production of alpha alumina by a sol-gel route. The present invention provides such a process and thus makes available to the maker of high grade alpha alumina products, or the catalyst monolith producer where alpha alumina is not required, a feedstock that had previously been unacceptable on account of the presence of agglomerated particles.

DESCRIPTION OF THE INVENTION

The present invention provides a process for the production of a colloidal boehmite which comprises providing a slurry of an alumina hydrate having a dispersibility, as hereinafter defined, of less than 70% and acidifying the slurry to a pH of about 3.5 or lower by adding acid in sufficient quantities to partially dissolve the alumina hydrate and to reach the above value but insufficient to cause the alumina hydrate to dissolve completely, then digesting the acidified mixture at a temperature of from about 150 to about 200° C. under a pressure of from about 5 to about 20 atmospheres for a time of from about 0.15 to about 4 hours so as to produce a colloidal boehmite with a dispersibility of at least about 90%.

The aluminous starting material can be a boehmite with a relatively high percentage of aggregated particles, an alumina trihydrate, an amorphous alumina resulting from the hydrolysis of an alkoxide. Most preferably it is a boehmite.

The dispersibility is defined as being the weight % of solids that cannot be centrifuged out of the dispersion by centrifuging in a polypropylene tube, (18mm×100mm), at 3500G for 3 minutes. This property is therefore a measure of the presence of larger agglomerates in the material. The dispersibility is a guide to the quality of the final product that can be obtained from the boehmite by sintering. If a product with agglomerates is used, that is a product with a relatively low dispersibility, the final product will have a high "Spot Index". This parameter is measured by preparing abrasive grain with a size of 50 grit, (according to FEPA specifications), by the seeded sol-gel process described in U.S. Pat. No. 4,623,364. This grain is then mounted in an epoxy resin, and the grain surface is polished with a diamond powder. The polished surface is examined under visible light with a microscope at a magnification of 250×. The blemishes in each grain are then counted. After 50 grains have been counted, the spot index, (SI), is calculated from the following formula:

$$SI = 2(A + 2B + 3C + 4D)$$

where:

A is the number of grains with 1-3 blemishes;
B is the number of grains with 4-6 blemishes;
C is the number of grains with 7-10 blemishes; and
D is the number of grains with 11 or more blemishes.

The Spot Index is therefore a direct indication of the number and size of agglomerates which appear in the final grain as blemishes.

An important feature of the present invention is that the thermal treatment is carried out at a pH of 3.5 or lower and preferably 3 or lower. As will be shown below, operation at higher pH values leads to poor dispersibility and a high spot index. Thus, while conversion to boehmite is efficiently achieved using the higher pH values described in prior art processes, the result is a boehmite with an excessive quantity of non-dispersible particles which are reflected in blemishes in any abrasive alpha alumina particles prepared therefrom.

The temperature at which the treatment is carried out is also significant. In general this temperature should be from about 150° to about 190° C. and more preferably from about 160° to about 180° C. Since the higher temperatures tend to be more effective in reducing the Spot Index, temperatures in the upper halves of the above ranges are more preferred.

The heating is preferably conducted under autogenous pressure which conventionally reaches from about 10 to about 15 atmospheres. The pressure can of course be generated artificially if desired without changing the essential nature of the invention. Such pressure can range from about 5 to 20 atmospheres but preferably lies within the same range as autogenously generated pressure.

The time of the treatment is conveniently from about 10 to about 120 minutes. In general there is little benefit to be derived from a treatment longer than from about 30 to about 90 minutes at the treatment temperature.

The process of the invention can be carried out in the presence of other additives conferring specific advantages such as electrolytes for the control of viscosity and solids content; compounds that liberate a gas upon heating, (such as metal carbonates), if a porous end product is desired; modifiers such as magnesia, zirconia, chromia and the like; grain growth inhibitors such as silica; and drying agents.

Of particular utility is the addition of seed material. Where the material treated is boehmite with a comparatively low dispersibility, it may often be advantageous to incorporate a seed material that enhances the conversion of such boehmite to alpha alumina at lower temperatures. Such seed materials have the same crystal structure as alpha alumina with crystal lattice parameters that are close to those of alpha alumina. The best example is of course alpha alumina itself but other compounds with close lattice parameter matches, such as alpha ferric oxide or a precursor of such a compound, can be used. The seed can be added before or after the hydrothermal treatment though addition before often makes the dispersion problem more tractable.

Where the compound is a precursor of boehmite it can often be useful to incorporate a seed material that promotes the formation of boehmite in the same way that an alpha-conversion seed material promotes the formation of alpha alumina. A typical boehmite-conversion promoting material is boehmite itself.

Where a seed material is present, it is important that it be present in a well dispersed, finely divided form. Seed particle sizes below one micron are in general preferred and particles less than 0.1 micron are even more preferred.

It is also within the scope of this invention to subject the boehmite or boehmite precursor having seed material incorporated therein, to a further process in which a sol of the treated boehmite is gelled and then formed, dried and fired to convert to alpha alumina. This corresponds to the processes described for example in U.S. Pat. Nos. 4,314,364; 4,623,364; 4,744,802; 4,964,883; (Jimmies); Published PCT Applications 90/08744 and 90/02160; and the like.

The hydrothermal treatment of the invention can be carried out on a batch or a continuous basis and the water, the boehmite or the boehmite precursor can be subjected to a prior or subsequent deionization process if so desired.

DESCRIPTION OF PREFERRED EMBODIMENTS

The invention is now further described with reference to the following examples which are for the purpose of illustration only and should not be interpreted as imposing any necessary limitation on the essential scope of the invention.

EXAMPLE 1

This Example illustrates the control over particle size and dispersibility by a treatment according to the invention.

Several test samples were given a hydrothermal treatment by placing 3.0 g of Kaiser forming grade alumina monohydrate, (boehmite), in a large pyrex test tube along with 30 ml of tap water and 1.2 ml of 18 wt. % of nitric acid, (enough to lower the pH of the mixture to below 3.5). The tubes were sealed by melting the end. Each tube was placed in a steel canister and placed in a pre-heated oven maintained at about 185° C.+/−5° C. The autogenous pressure is estimated at about 11 atmospheres.

As controls, the starting material was evaluated without the hydrothermal treatment and also with the hydrothermal treatment except for the exclusion of the acid.

It was found that, after 3 hours of acidified hydrothermal treatment, the initial powdery slurry had turned to a translucent gel filling the available liquid volume. There was no evidence of any of the original powder remaining. As time in the autoclave increased, the appearance of the gel gradually became more opaque and after 96 hours resembled dairy cream or a talcum powder dispersion.

TABLE 1

| Hours in Autoclave | Acid (+/−) | Dispersibility % | Ultimate Crystallite Size (A)* | Hardness after sintering** (GPa) |
| --- | --- | --- | --- | --- |
| Control | | | | |
| 0 | − | 30 | 64 +/− 1 | <3 |
| 3 | − | 35 | 64 +/− 1 | <3 |
| 0 | + | 30–35 | 64 +/− 1 | <3 |
| Evaluation | | | | |
| 1 | + | 39 | 75 +/− 1 | ND |
| 3 | + | 95 | 119 +/− 3 | 5–6 |
| 8 | + | 97 | 259 +/− 14 | 5–6 |
| 24 | + | 92 | 481 +/− 52 | 5–6 |
| 96 | + | 63 | 842 +/− 160 | 5–6 |

*Measured using an x-ray diffraction line broadening technique and the equation:

$$D = \frac{1.11 \times Y \times 57.3}{(B1/2 - b1/2)\cos\frac{(20)}{2}}$$

where:
Y = Cuk radiation = 1.54A
b½ = width in degrees at half maximum of a reference material with crystallite size > 3000A
B½ = Width in degrees at half maximum of the sample of interest
20 = peak angle in degrees
57.3 = conversion factor radians/degrees
The 120 reflection was used in the measurement.
**Product sintered for 1 hour at 1400–1425° C. A Wilson Tukon microhardness tester, model LR, was used As can be seen from the above, the presence of the acid significantly increased the dispersibility of the boehmite provided the time of treatment is not too prolonged. The particle size grew at a rate consistent with classical theory, i.e. as a function of the cube root of time. When the particles became very large there was a tendency to agglomeration and the dispersibility decreased markedly.

EXAMPLE 2

This Example describes the results of subjecting a different alumina monohydrate to the hydrothermal treatment described in Example 1.

A sample of W. R. Grace SRA spray dried sludge SMR 14-1617 was given the hydrothermal treatment described in Example 1 for 3 hours at a temperature of 185° C. except that 1.0 g of magnesium nitrate were added to the mixture. Before treatment the dispersibility was 37% and afterwards it was 97%. The material, as received and before treatment, would not sinter to a dense body whereas the treated product formed a translucent gel, dried to a rigid green form and sintered well to a hardness of 15+/−1 GPa, (>80% of theoretical).

EXAMPLE 3

This Example shows that the process of the invention is also effective with a seeded boehmite.

An aluminum monohydrate (200 g) available from Conoco under the trade name, Catapal, was mixed with 500 ml of water in a waring blender for one minute. To the resulting slurry were added 11.6 g of an alpha alumina slurry containing 12.9% by weight of sub-micron alpha alumina.

Nitric acid was then added to the resultant slurry with stirring, in the form of an 18 wt. % solution. A 100 g sample was kept as a reference and the remainder was autoclaved in a PARR one litre model 4521 stainless steel autoclave equipped with a stirrer mechanism. The heat-up time was approximately 45 minutes and the time at the designated temperature is shown in the Table 2 below. After this the autoclave was switched off and cooled to ambient temperature over a period of about an hour. Upon cooling the samples were tested and the results appear in Table 2.

TABLE 2

| Temp. (°C.) | pH | Ratio Acid/ Boeh- mite | Time (hr) | Dispersibility Before | Dispersibility After | Spot Index Before | Spot Index After | Hard- ness (GPa) |
| --- | --- | --- | --- | --- | --- | --- | --- | --- |
| 160 | 2 | N.D. | 0.5 | 94.9% | 98.2% | 400 | 205 | 20.3 |
| 160 | 2 | N.D. | 1.0 | 94.9% | 98.0% | 400 | 250 | 20.3 |
| 160 | 3 | 0.012 | 0.5 | 61.9% | 95.9% | 400 | | 20.8 |
| 160 | 3 | 0.012 | 1.0 | 61.9% | 95.5% | 400 | 349 | 21.1 |
| 160 | 4 | 0.005 | 0.5 | 60.8% | 54.1% | 400 | N.D. | <10.0 |
| 160 | 4 | 0.005 | 1.0 | 60.8% | 53.8% | 400 | N.D. | <10.0 |
| 180 | 2 | N.D. | 0.5 | 94.9% | N.D. | 400 | 16 | 20.6 |
| 180 | 3 | 0.012 | 0.5 | 61.9% | 98.2% | 400 | 6 | 20.6 |
| 180 | 4 | 0.005 | 0.5 | 60.8% | 47.3% | 400 | N.D. | <10.0 |

Hardness was determined after sintering the hydrothermally treated sample at 1400° C. in air for 5 minutes.

As can be readily seen from the above data increasing the amount of acid increases the initial dispersibility but that at lower levels of acid, (but still at a pH below 4), the initial low dispersibility can be improved by the hydrothermal treatment of the invention. In addition it is clear that increasing the temperature results in a highly beneficial improvement in the Spot Index. Finally, operation at pH of 4 resulted in a very low hardness in the final sintered product.

EXAMPLE 4

This Example follows the procedure of Example 3 except that a different boehmite is used.

The alumina monohydrate used was Versal 450, available from Kaiser Chemical Co. and made by neutralization of sodium aluminate liquor. In addition the seeding slurry was added in an amount of 23.2 g. The results appear in Table 3.

TABLE 3

| Temp. (°C.) | pH | Ratio Acid/ Boeh- mite | Time (hr) | Dispersibility Before | Dispersibility After | Spot Index Before | Spot Index After | Hard- ness (GPa) |
| --- | --- | --- | --- | --- | --- | --- | --- | --- |
| 160 | 2 | N.D. | 0.5 | 44.7 | 71.5 | >1000 | N.D. | 18.0 |
| 160 | 2 | N.D. | 1.0 | 44.7 | N.D. | >1000 | 38 | 17.4 |
| 160 | 3 | 0.023 | 0.5 | 46.3 | 71.5 | >1000 | 400 | N.D. |
| 160 | 3 | 0.023 | 1.0 | 46.3 | 78.6 | >1000 | 400 | 14.2 |
| 180 | 2 | N.D. | 0.5 | 44.7 | 98.8 | >1000 | 21 | 19.0 |
| 180 | 3 | 0.023 | 0.5 | 46.3 | 97.9 | >1000 | 226 | 19.3 |
| Control (No Autoclave) | | | | | | | | |
| — | 3 | 0.023 | — | 46.3 | — | >1000 | — | <10 |

As will be apparent, the hydrothermal treatment markedly improves the dispersibility and the Spot Index very dramatically. In addition the sinterability, as indicated by the hardness, improves significantly as a result of the treatment.

EXAMPLE 5

This Example duplicates the procedure of Example 4 with the difference that acetic acid replaced nitric acid. Enough of the acid was added to bring the pH to 3.3 prior to autoclaving. After autoclaving for half an hour at 160° C., the Spot Index had declined from 400 to 106, whilst at 180° C. the corresponding decline was from 400 to 9.

EXAMPLE 6

This Example illustrates the use of a boehmite precursor in place of boehmite itself.

An aluminum hydroxide fluid gel sold by Rehais Chemical Co. under the trade name "Liquigel" was treated with nitric acid to reduce the pH to below about 3.5 and then autoclaved at 185° C. for 7 hours. The gel contained about 20 wt. % of alumina and could be dried to a fine powder.

After the autoclaving the fluid gel was found to have gelled to fill the liquid volume in the tube. The gel was removed, dried, pre-fired at 800° C. for one hour and then fired at 1400° C. for one hour to yield a very hard but porous ceramic body through which air could easily flow. The dried gel shape was retained throughout the firing process.

The high porosity is believed to result from the presence of a fraction of carbonate in the fluid gel as well as concentration effects. The original product was x-ray amorphous and after autoclaving the product was boehmite with an ultimate crystallite size of 96A+/−3.

From the above Examples it can readily be appreciated that the process provides a most advantageous route to obtaining a boehmite with a greatly improved dispersibility at a relatively low cost. Moreover this process can use relatively poorly dispersible starting materials which in general are cheaper. Because the starting material is a fluid slurry, sol or gel, dispersion of additives or seed materials in the precursor is easy. The process also offers the opportunity to control crystallite size in the final product.

What is claimed is:

1. A process for the production of alpha alumina which comprises providing a starting material which is an aqueous dispersion in which the dispersed phase consists of boehmite having a dispersibility of less than 70% and acidifying the dispersion to a pH of from 2 to 3 by adding acid in sufficient quantity to lower the pH to the above level but insufficient to cause the alumina compound to dissolve completely, then subjecting the dispersion to a hydrothermal treatment by heating it under an autogenous pressure of from about 10 to 15 atmospheres at a temperature of from about 150° to 200° C. for a time of from 0.15 to about 8 hours so as to produce a colloidal boehmite with a dispersibility of at least 95%, adding seed material effective to promote the formation of alpha alumina, and drying and sintering to form alpha alumina particles with a Spot Index reduced to less than 50% of the figure obtained by forming the alpha alumina from the untreated boehmite starting material without the hydrothermal treatment.

* * * * *